(12) United States Patent
Shou

(10) Patent No.: US 7,127,130 B2
(45) Date of Patent: Oct. 24, 2006

(54) POLARIZATION-MAINTAINING OPTICAL ISOLATOR

(75) Inventor: Nathan L. Shou, San Francisco, CA (US)

(73) Assignee: Intel Corporation, Santa Clara, CA (US)

(*) Notice: Subject to any disclaimer, the term of this patent is extended or adjusted under 35 U.S.C. 154(b) by 96 days.

(21) Appl. No.: 10/607,926

(22) Filed: Jun. 27, 2003

(65) Prior Publication Data

US 2004/0264829 A1    Dec. 30, 2004

(51) Int. Cl.
G02B 6/27    (2006.01)
G02B 5/30    (2006.01)

(52) U.S. Cl. .......................................... 385/11
(58) Field of Classification Search ............... 385/11; 359/497

See application file for complete search history.

(56) References Cited

U.S. PATENT DOCUMENTS 5,727,109 A * 3/1998 Pan et al. ................ 385/140
6,178,044 B1 * 1/2001 Li et al. .................. 359/484
6,587,266 B1 * 7/2003 Tai et al. ................ 359/484
2003/0090796 A1 * 5/2003 Tai et al. ................ 359/484
2004/0184148 A1 * 9/2004 Chang et al. ........... 359/497

* cited by examiner

Primary Examiner—Frank G Font
Assistant Examiner—Eric Wong
(74) Attorney, Agent, or Firm—Blakely, Sokoloff, Taylor & Zafman LLP

(57) ABSTRACT

The application discloses an optical isolator having an input and an output, the optical isolator comprising a phase retardation plate positioned at the input, and an optical rotator positioned between the phase-retardation plate and the output, the isolator comprising a Faraday rotator positioned between a first polarizer and a second polarizer. The application also discloses a process comprising rotating a polarization of an optical signal using a phase retardation plate, and following the rotation of the polarization of the optical signal using a phase retardation plate, further rotating the polarization of the optical signal using an optical rotator.

22 Claims, 4 Drawing Sheets

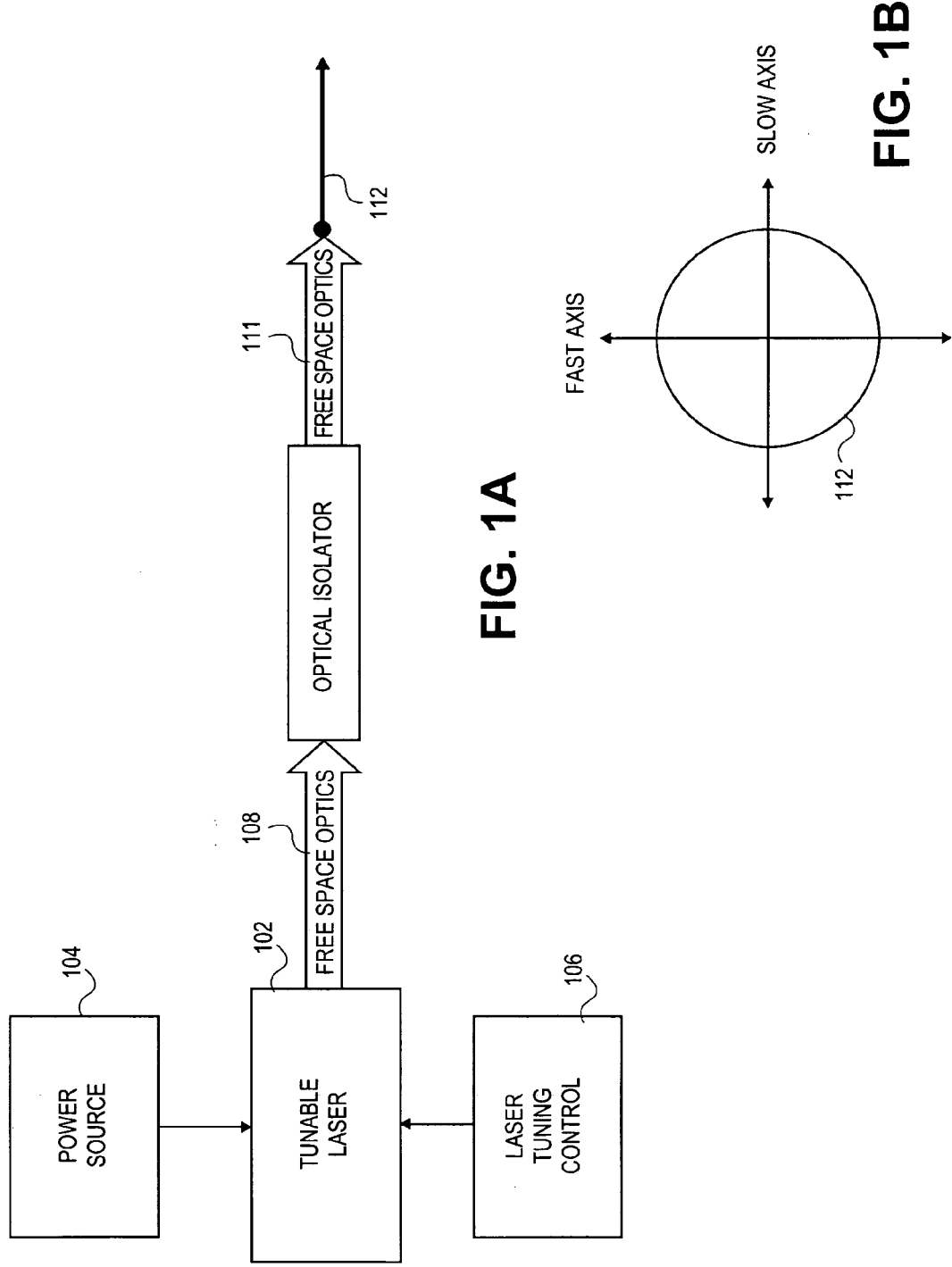

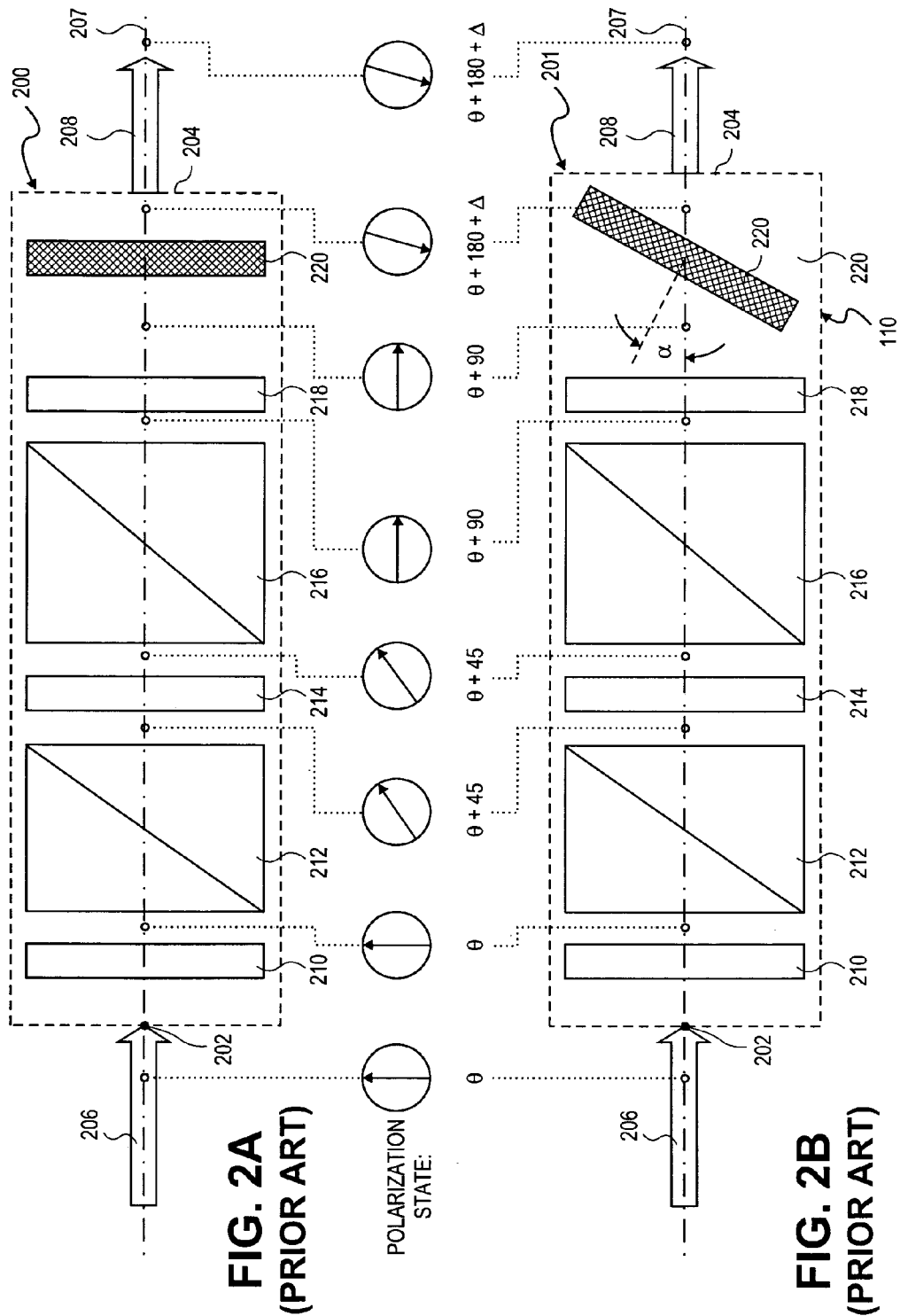

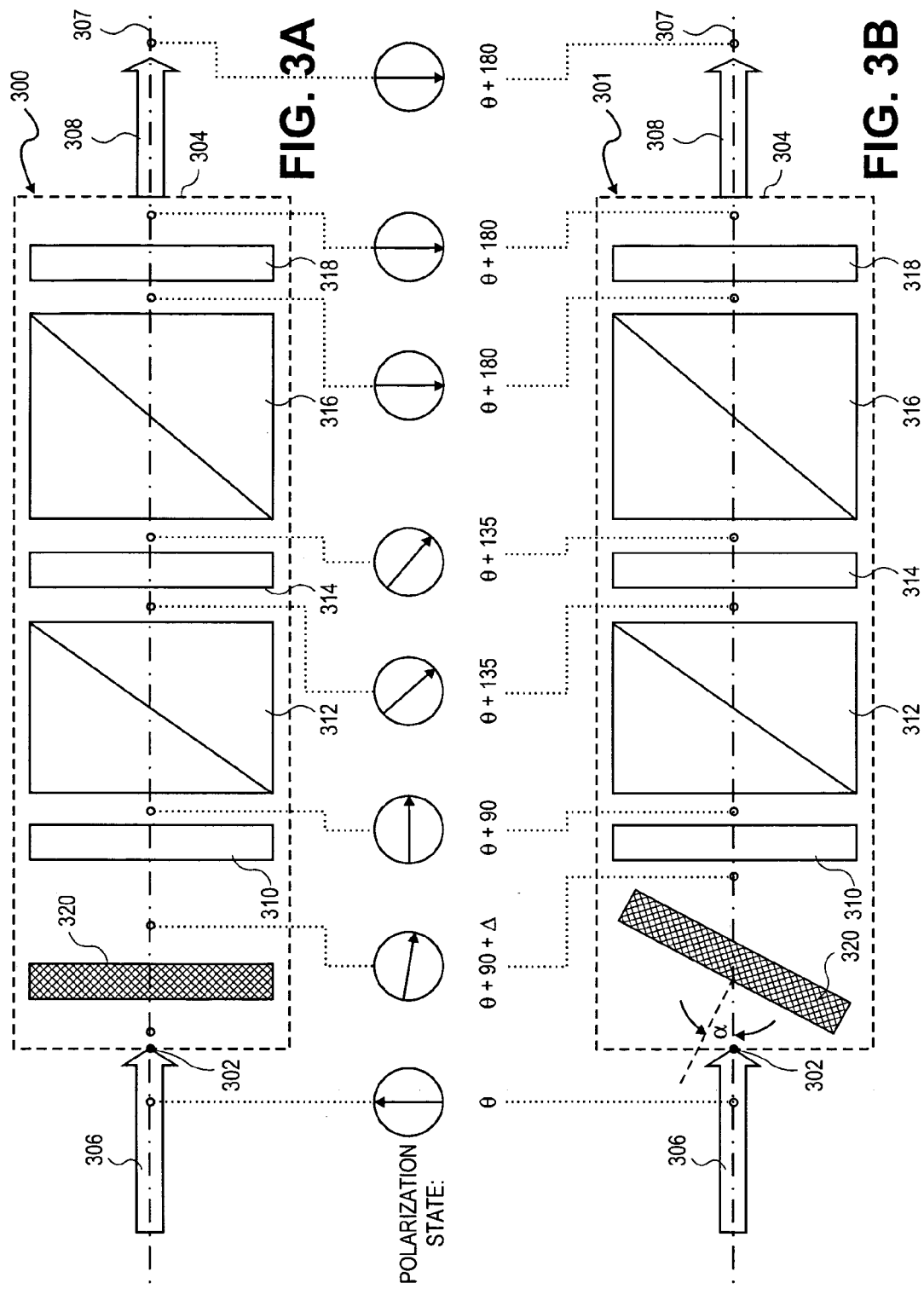

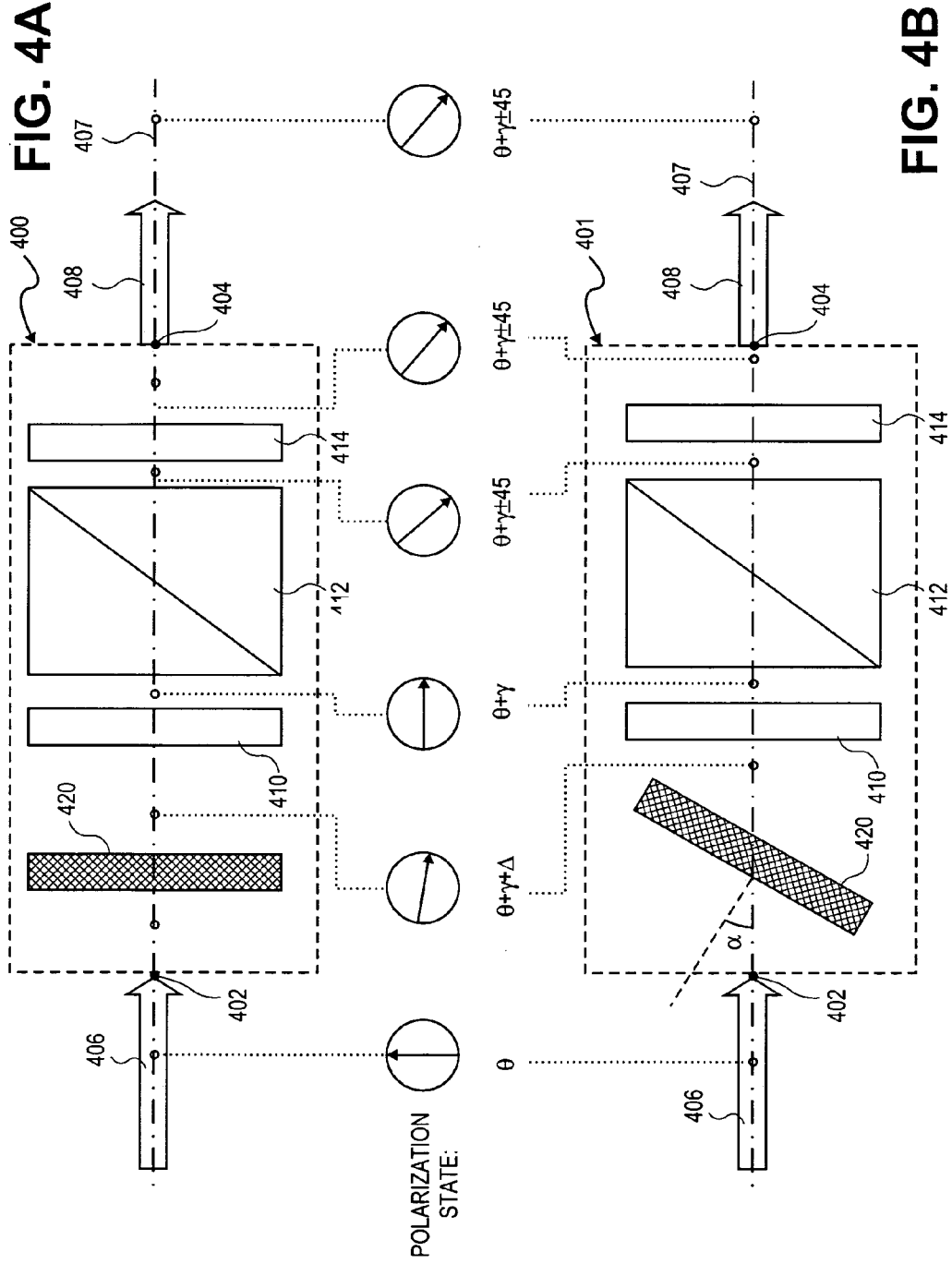

US 7,127,130 B2

POLARIZATION-MAINTAINING OPTICAL ISOLATOR

TECHNICAL FIELD

The present invention relates generally optical isolators and in particular, but not exclusively, to polarization-maintaining optical isolators.

BACKGROUND

Optical isolators are devices that allow radiation (usually light) to pass through them in one direction, but not in the opposite direction. In a typical optical-fiber-based system, a laser is coupled to an optical isolator through free space optics then through other free space optics to an optical fiber, through which the output of the laser is directed. Isolators are needed in optical systems in many roles, the most common of which is preventing reflections from returning toward, re-entering, and disrupting the operation of the laser. Optical isolators, then, are the optical analog of a diode in an electrical circuit.

The most basic optical isolators accomplish their task by rotating the state of polarization (i.e., its electric and magnetic field vectors) of the light entering the isolator. Most optical phenomena are reciprocal, however, so construction of an isolator is not necessarily straightforward. One optical phenomenon that is not reciprocal—and is therefore useful in constructing an isolator—is known as the "Faraday effect." The Faraday effect occurs when certain materials, for instance Yttrium-Iron-Garnet (YIG), are placed in a strong magnetic field. Light traveling within the material has its state of polarization (i.e., its electric and magnetic field vectors) rotated by an amount depending on the length of the material and the strength of the magnetic field. The most important aspect is that the Faraday effect is nonreciprocal: light traveling in one direction may have its polarization rotated counterclockwise by, for example 45°, but light traveling in the opposite direction would have its polarization rotated clockwise by the same amount (45° in this example). Thus, the rotation is in opposite directions relative to the direction of the ray of light, but in the same direction in relation to the rotator. A device that uses the Faraday effect is commonly known as a "Faraday rotator." A simple single-stage optical isolator consists of a Faraday rotator sandwiched between a pair of polarizing filters. Two-stage optical isolators are built by adding further rotators and polarizing filters to one-stage isolators.

For certain applications, it is desirable to have a polarization-maintaining isolator; in other words, an isolator in which the polarization state of the output is the same as the polarization state of the input. Two polarization states are considered the same if the orientation of the first state's polarization plane differs from the second state's polarization plane by 180° ($\pi$ radians), or some integer multiple thereof. One approach commonly used in the prior art to build a polarization-maintaining isolator is to put a phase retardation plate (also known as a wave plate) following a two-stage optical isolator. In this type of isolator, one half the rotation of the state of polarization is accomplished by the two-stage isolator. The phase retardation plate accomplishes the final half of the overall rotation. Phase retardation plates, however, are designed for one specific wavelength and are very sensitive to variables such as manufacturing tolerances, meaning that the phase retardation plate introduces errors in the rotation of the polarization state, particularly in situations where the wavelength of the light is difficult to control, or where it is purposely varied. These errors can have a significant effect on the proper operation of existing isolators and limit their application.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1A is a drawing of a typical fiber-based laser optical system.

FIG. 1B is a drawing showing the operation of a polarization-maintaining fiber.

FIG. 2A is a drawing of a prior art polarization-maintaining optical isolator.

FIG. 2B is a drawing of an alternative embodiment of a prior art polarization-maintaining optical isolator.

FIG. 3A is a drawing of an embodiment of the inventive polarization-maintaining optical isolator.

FIG. 3B is a drawing of an alternative embodiment of the inventive polarization-maintaining optical isolator shown in FIG. 3A.

FIG. 4A is a drawing of another alternative embodiment of the inventive polarization-maintaining optical isolator.

FIG. 4B is a drawing of an alternative embodiment of the inventive polarization-maintaining optical isolator shown in FIG. 4A.

DETAILED DESCRIPTION OF THE ILLUSTRATED EMBODIMENTS

Embodiments of an apparatus and method for polarization-maintaining optical isolation are described herein. In the following description, numerous specific details are described to provide a thorough understanding of embodiments of the invention. One skilled in the relevant art will recognize, however, that the invention can be practiced without one or more of the specific details, or with other methods, components, materials, etc. In some instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

FIG. 1 illustrates an embodiment of an optical system 100. The optical system 100 includes a laser 102 connected to a power source 104 and, in cases where the laser 102 is tunable (i.e., the frequency and/or wavelength of the laser's output can be varied), it is also connected to a tuning control 106. The laser 102 is coupled to the input of an optical isolator 110 by free space optics 108 and, similarly, the output of the optical isolator 110 is coupled through free space optics 111 to some destination for the laser light by an optical fiber 112. In operation of the apparatus 100, light from the laser 102 is directed into the free space optics 108 and travels to the input of the optical isolator 110. As described above, the optical isolator prevents light from returning toward the laser along free space optics 108, functioning analogously to a diode in an electrical circuit. After entering the optical isolator 110 through free space optics 108, the laser is output from the optical isolator through free space optics 111 and optical fiber 112. In cases where the laser 102 is tunable, the laser tuning control 106, by adjusting various parameters within the laser 102 can adjust the wavelength and, correspondingly, the frequency of the signal output into free space optics 108, and thus the signal directed into the optical isolator 110.

In certain applications the light emitted by the laser 102 has a certain state of polarization (SOP) (i.e., it is polarized in a certain orientation) and it is the same polarization must be maintained throughout all or parts from 108 to 111. In such applications the optical isolator 110 will be a polarization-maintaining isolator, and the optical fibers 108 and 112 will be polarization-maintaining (PM) fiber. Polarization maintaining isolators are a special type of isolator that prevent light from returning down the fiber 108 toward the laser, while simultaneously keeping the laser light in the same polarization state between the input and the output of the isolator. The objective of using PM fiber is that when polarized light is launched into a PM fiber, the polarization state will remain constant along the fiber. Polarization-maintaining isolators are frequently used in conjunction with polarization-maintaining (PM) optical fiber.

FIG. 1B is a cross-section of a typical PM fiber, illustrating the PM fiber's function. Standard single mode fiber does not maintain a polarization state; as the signal travels along the single-mode fiber, power coupling between the polarization modes occurs more or less randomly as dictated by minor variations in the geometry of the fiber. Polarization maintenance in optical fiber is usually achieved by making the fiber highly birefringent, meaning that the fiber has large differences in refractive index (and thus phase velocity) for two orthogonal polarizations. Birefringence is usually achieved by making the fiber with an asymmetric profile. The phase velocity difference between modes minimizes the possibility of coupling, since the modes can't stay resonant long enough for significant coupling to occur. As shown in FIG. 1B the PM fiber has two orthogonal axes of polarization—the "fast" axis and the "slow" axis. The fast axis is the one along which the light experiences a lower refractive index than on the slow axis. Various configurations of PM fiber exist, including elliptical core fiber, bow-tie fiber and polarization maintaining and absorption reducing (PANDA) fiber.

Importantly, the polarization state in a PM fiber remains constant if and only if the polarization state at launch—that is, the polarization state at the time the light enters the fiber—exactly matches one of the two polarization axes of the fiber. If the polarization state does not exactly match one of the polarization axes (i.e., if the polarization of the launch light is at an angle to the polarization axis of the fiber) then the polarization state will rotate continuously as the signal travels along the fiber. Thus, use of PM fiber requires very careful alignment of the polarization of the input light with one or the other axis of the fiber (almost always the slow axis). Since the function of the optical isolator depends on the polarization state, it must be carefully designed to ensure that the polarization state of the light input through fiber 108 is rotated very precisely before output into the polarization-maintaining fiber 112.

FIG. 2A illustrates the construction and internal details of a prior art polarization-maintaining optical isolator 200. The isolator 200 has an input end 202, and an output end 204. In the embodiment shown, light propagating through the isolator generally travels along a path 207 as it traverses several components within the isolator 200. The isolator 200 comprises a two-stage rotator coupled to a phase retardation plate 220, which in this embodiment is a half wave ($\lambda/2$) plate. The first stage of the two-stage rotator comprises a first Faraday rotator 212 sandwiched between a first polarizer 210 and a second polarizer 214. Similarly, the second stage of the two-stage rotator comprises a second Faraday rotator 216 sandwiched between the second polarizer 214 and a third polarizer 218. Following the second polarizer 218, the phase retardation plate (also known as a half wave plate) is positioned just prior to the output 204 of the isolator.

Operation of the polarization-maintaining isolator 200 is illustrated by the series of drawings underneath the figure. As the signal 206 enters the isolator 200, it travels along the path 207 through the various components of the isolator. The drawings illustrate the polarization state of the light at different locations in the isolator as it traverses different components of the isolator. A light signal 206 enters the isolator at the input end 202. The signal 206 has an initial polarization state θ, which in this case is vertical but in other cases can be any arbitrary θ. As the signal 206 passes through the first polarizer 210 the polarizer filters out stray polarizations that vary from the initial polarization state θ and the polarization state remains at θ. After passing through the polarizer 210, the signal 206 travels through the first Faraday rotator 212, where its polarization is rotated by a specified amount, in this case 45°, to θ+45°. Next, the signal 206 travels through a second polarizer 214, which filters out any extraneous polarization states so that the polarization state remains at θ+45° after passing through the polarizer 214. Next, the signal travels through a second Faraday rotator 216, where its polarization state is rotated by a further amount, in this case 45°, so that the polarization state at the output of the Faraday rotator 216 is θ+90°. After traversing the second Faraday rotator 216, the signal propagates through a third polarizer 218, which again filters out extraneous polarization states to ensure that only the polarization state at θ+90° remains.

After traversing the two-stage rotator, the signal's polarization state has been rotated by a total of 90°. To rotate the polarization state a further 90°—thus ensuring polarization maintenance by the isolator 200, since two polarization states are considered the same if the orientation of the first state's polarization plane differs from the second state's polarization plane by 180° (π radians), or some integer multiple thereof—the signal travels through a half wave plate 220 (also known as a half wave plate or a $\lambda/2$ plate). The half wave plate 220 rotates the polarization state of the signal a further 90°. Half wave plates are extremely sensitive to manufacturing tolerances, as well as the exact wavelength of the incident signal, so in most cases the half wave plate 220 will tend to introduce an error into the rotation of the polarization state, such that the polarization state will either be over- or under-rotated by an error amount Δ. A half wave plate is designed to have half wave according to the equation $$\frac{[n_2(\lambda_0) - n_1(\lambda_0)]2nd}{\lambda_0 \cos(\alpha)} = m\pi,$$

where $n_2(\lambda_0)$ and $n_1(\lambda_0)$ are the indices of refraction of the wave plate, d is the thickness of the wave plate, $\lambda_0$ is the wavelength of light, α is the angle of incidence, and mπ is the integer multiple of phase retardation values to make it a half wave plate. Because of the material properties $n_2(\lambda_0)$, $n_1(\lambda_0)$, and d there is only one $\lambda_0$ that satisfies the equation and is the design wavelength. When $\lambda$ or $\alpha$ is varied the wave plate no longer produces retardation of $m\pi$. Consequently, the polarization rotation has an error $\Delta$. The light is no longer linearly polarized, and the polarization extinction suffers as a result.

As shown in the figure, the polarization state has been over-rotated by $+\Delta$, although an under-rotation $-\Delta$ is also possible. After exiting the half wave plate 220, the signal exits the isolator 200 through the output end 204 and becomes output signal 208. The output signal 208 maintains the same polarization as it had when it exit the half wave plate 220; that is, it maintains the error $\Delta$ included by the over or under rotation and degraded polarization extinction caused by the half wave plate.

Since an isolator such as isolator 200 will be used with PM fiber, using an isolator such as the isolator 200 can create problems because of the polarization rotation error $\Delta$ and extinction degradation introduced by the half wave plate 220. As described above, the polarization state of light launched into a PM fiber must align exactly with the axis of the PM fiber for polarization to be maintained throughout the fiber. By introducing the error $\Delta$ in the rotation of the polarization state, however, the isolator 200 impairs or destroys the ability to maintain a polarization state in a fiber downstream of the isolator 200. The introduction of the polarization error $\Delta$ by the half wave plate 220 is particularly troublesome in cases where the isolator 200 is used in conjunction with a tunable laser. Half wave plates are designed for one particular wavelength, and even minor deviations of the incident light from that wavelength will cause the half wave plate 220 to vary the amount it rotates the signal. Thus, the error $\Delta$ will become correspondingly larger as the wavelength of the input signal 206 varies from the design wavelength of the half wave plate 220. This makes isolation particularly difficult with a tunable laser, since it would be impractical to insert a new half wave plate 220 into the isolator for each wavelength, or to use a different isolator 200 for each wavelength. By degrading polarization extinction, the isolator 200 also impairs or destroys the ability to maintain a polarization state in the PM fiber. This is also very undesirable.

FIG. 2B illustrates an alternative embodiment 201 of the optical isolator 200. The optical isolator 201 is also well known in the prior art. The isolator 201 is substantially similar to the isolator 200, except for the orientation of the half wave plate 220. In some applications, the half wave plate 220 is rotated such that it is at an angle $\alpha$ with respect to the light path 207. This rotation is done to further minimize the amount of light reflected by the isolator toward the origin of the input signal 206. Rotating the half wave plate 220 by an angle $\alpha$, however, changes the effective thickness of the half wave plate from d to $d/\cos(\alpha)$. As described above, the thickness of the half wave plate 220 is very carefully calibrated to the wavelength of the signal whose polarization is being rotated. By tilting the half wave plate 220 as shown, the effective thickness of the half wave plate 220 is increased, resulting in an increase in the over- or under-rotation $\Delta$ of the light propagating through the half wave plate. Therefore, although the rotation of the half wave plate 220 enhances the isolation properties of the isolator 201, it makes it more difficult to accurately maintain the polarization state of the input signal 206 throughout the entire isolator to the output signal 208.

FIG. 3A illustrates a polarization-maintaining isolator 300 embodying the present invention. The polarization-maintaining isolator 300 has an input end 302 and an output end 304. In the embodiment shown, light propagating through the isolator generally travels between the input and output along a path 307 as it traverses the isolator 300. The isolator 300 comprises a half wave plate 330, followed by a two-stage rotator. The first stage of the two-stage rotator comprises a first Faraday rotator 312 sandwiched between a first polarizer 310 and a second polarizer 314. Similarly, the second stage of the two-stage rotator comprises a second Faraday rotator 316 sandwiched between the second polarizer 314 and a third polarizer 318. The elements of the isolator 300 are shown laid out along a light path 307, which in this embodiment is a straight line but in other embodiments could have a different shape, such as by using mirrors to fold the light path as it travels through the isolator 300.

Operation of the polarization-maintaining isolator 300 is illustrated by the series of drawings below FIG. 3A. As the signal 306 enters the isolator 300, it propagates along the path 307 through the various components of the isolator. The drawings illustrate the polarization state of the light at different locations in the isolator. A light signal 306 enters the isolator at the input end 302. The signal 306 has an initial polarization state $\theta$, which in this case is vertical but in other cases can be any arbitrary $\theta$. The half wave plate 320 rotates the polarization state of the signal by 90° to $\theta+90°$. As discussed above, in most cases the half wave plate 320 will introduce an error into the rotation of the polarization state, such that the polarization state will either be over- or under-rotated by an error amount $\Delta$. As shown in the figure, the polarization state has been over-rotated by $+\Delta$, although an under-rotation $-\Delta$ is also possible. The polarization extinction ratio is also degraded in most cases.

After traversing the half wave plate, the signal's polarization state has been rotated by 90°. To rotate the polarization state of the light a further 90°—thus ensuring polarization maintenance by the isolator 300—the signal travels through a two-stage rotator. As the signal 306 passes through the first polarizer 310 the polarizer filters out any polarization that varies from $\theta+90°$; in other words, the first polarizer removes the error $\Delta$ introduced by the half wave plate, leaving the polarization state exactly at $\theta+90°$. Also, the polarizer 310 allows only linearly polarized light to pass through; in other words, the first polarizer removes the degraded polarization extinction ratio by absorbing light polarized in directions other than $\theta+90°$. After passing through the polarizer 310, the signal 306 travels through the first Faraday rotator 312, where its polarization is rotated by a specified amount, in this case 45°, to $\theta+135°$. Next, the signal 306 travels through a second polarizer 314, which filters out any extraneous polarization states so that the polarization state remains at $\theta+135°$ after passing through the polarizer 314. Next, the signal travels through a second Faraday rotator 316, where its polarization state is rotated by a further amount, in this case 45°, so that the polarization state at the output of the Faraday rotator 316 is $\theta+180°$. After traversing the second Faraday rotator 316, the signal propagates through a third polarizer 318, which again filters out extraneous polarization states to ensure that only the polarization state at $\theta+180°$ remains. After exiting the polarizer 318, the signal exits the isolator 300 through the output end 304 and becomes output signal 308. The output signal 308 maintains the same polarization as it had when it exit the polarizer; that is, its polarization state is rotated by exactly 180°, and the error $\Delta$ included by the over or under rotation caused by the half wave plate is removed.

An isolator such as isolator 300 will most often be used with PM fiber. As described above, the polarization state of light launched into a PM fiber must align exactly with the axis of the PM fiber for polarization to be maintained throughout the fiber. In the isolator 300, the polarization extinction ratio degradation and error Δ in the rotation of the polarization state are eliminated, meaning that the isolator 300 is ideal for maintaining a polarization state in a fiber downstream of the isolator 300. Isolator 300 is particularly useful in conjunction with a tunable laser. Half wave plates are designed for one particular wavelength, and even minor deviations of the incident light from that wavelength will cause the half wave plate 320 to vary the amount it rotates the signal. Thus, the polarization extinction ratio degradation and error Δ will become correspondingly larger as the wavelength of the input signal 306 varies from the design wavelength of the half wave plate 320. Isolator 300, however, eliminates the polarization extinction ratio degradation and error Δ, making polarization-maintaining isolation possible with a tunable laser.

FIG. 3B illustrates an alternative embodiment 301 of the isolator 300. In the isolator 301, the half wave plate 320 is positioned at an angle α with respect to the light path 307. As discussed above with connection with FIG. 2B, this is done to further reduce the amount of light reflected along the fiber toward the origin of the light signal. The net effect of tilting the half wave plate 320, however, is to increase the effective thickness of the half wave plate, thus increasing the polarization extinction ratio degradation and size of the error Δ either by under rotation or over rotation. In the isolator 300, however, any polarization extinction ratio degradations and errors Δ are removed by the rotators downstream of the half wave plate. This allows for excellent isolation combined with accurate polarization maintenance. The isolator 301 operates in the same manner as the isolator 300.

FIG. 4A illustrates another embodiment 400 of a polarization-maintaining isolator embodying the present invention. As with the isolator 300, the isolator 400 includes an input end 402 and an output end 404. Within the isolator 400 are a half wave plate 420 positioned at the input 402, followed by a single stage rotator comprising a Faraday rotator 412 sandwiched between a first polarizer 410 and a second polarizer 414. The construction of the isolator 400 is similar to that of the isolator 300, except that the isolator 400 has only one isolator stage rather than two. The isolator 400 can be used, for example, whenever accurate rotation by an arbitrary angle is needed. The half wave plate can be used to rotate the polarization of the input signal 406 in an arbitrary amount in the range $-90° \leq \gamma \leq 90°$. The half wave plate 420 still has produces a polarization rotation error Δ, and it degrades the polarization extinction ratio, but the polarizer 410 removes them just as in isolator 300. If the isolator 400 is used as a polarization-maintaining isolator, the angle γ will be ±45°, but the isolator 400 can be used for accurate rotation of the polarization to any arbitrary angle ±45°+γ, since it will eliminate any rotation error introduced by the half wave plate 420. FIG. 4B illustrates an alternative embodiment 401 of the isolator 400 having an inclined half wave plate.

Operation of the polarization-maintaining isolators 400 and 401 is similar to the operation of the isolator 300, except that after the half wave plate the light traverses only one rotator stage instead of two. As the signal 406 enters the isolator 400, it travels along the path 407 through the various components of the isolator. The drawings illustrate the polarization state of the light at different locations in the isolator as it traverses different components of the isolator.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An optical isolator having an input and an output, the optical isolator comprising:
    a phase retardation plate positioned at the input, wherein the phase retardation plate is the first polarization-modifying component encountered by an optical signal entering through the input; and
    an optical rotator positioned between the phase-retardation plate and the output, the optical rotator comprising a Faraday rotator positioned between a first polarizer and a second polarizer.

2. The optical isolator of claim 1 wherein the optical rotator further comprises a second Faraday rotator positioned between the second polarizer and a third polarizer.

3. The optical isolator of claim 1 wherein the phase retardation plate is a half wave (λ/2) phase retardation plate.

4. The optical isolator of claim 1 wherein the phase retardation plate is positioned at a selected angle relative to a light path.

5. The optical isolator of claim 1, further comprising a polarization-maintaining fiber coupled to the output.

6. The optical isolator of claim 1, further comprising a polarization-maintaining fiber coupled to the input.

7. The optical isolator of claim 1, further comprising a radiation source coupled to the input.

8. The optical isolator of claim 7 wherein the radiation source is a tunable laser.

9. A process comprising:
    rotating a polarization of an optical signal using a phase retardation plate, wherein the phase retardation plate is the first polarization-modifying component encountered by the optical signal; and
    following the rotation of the polarization of the optical signal using a phase retardation plate, further rotating the polarization of the optical signal using an optical rotator.

10. The process of claim 9 wherein further rotating the polarization of the optical signal comprises:
    filtering the optical signal passing through the phase retardation plate;
    rotating the filtered optical signal using a Faraday rotator; and
    filtering the optical signal passing through the Faraday rotator.

11. The process of claim 10, wherein the Faraday rotator is a first Faraday rotator, and wherein further rotating the polarization of the optical signal further comprises:
    rotating the filtered optical signal using a second Faraday rotator; and
    filtering the optical signal passing through the second Faraday rotator.

12. The process of claim 9 wherein the phase retardation plate is a half-wave (λ/2) phase retardation plate.

13. The process of claim 9 further comprising varying the wavelength of the optical signal.

14. The process of claim 9 further comprising inputting the optical signal to the phase retardation plate using a polarization-maintaining fiber.

15. The process of claim 9 further comprising outputting the signal from the optical rotator using a polarization maintaining fiber.

16. A system comprising:
   an optical signal source;
   an optical isolator having an input and an output, the optical signal source being coupled to the input, and the optical isolator comprising:
      a phase retardation plate positioned at the input, wherein the phase retardation plate is the first polarization-modifying component encountered by the optical signal,
      an optical rotator positioned after the phase-retardation plate, the optical rotator comprising a first Faraday rotator positioned between a first polarizer and a second polarizer; and
   a polarization-maintaining fiber connected to the output of the optical isolator.

17. The system of claim 16 wherein the isolator is a first isolator, and further comprising a second Faraday rotator positioned between the second polarizer and a third polarizer.

18. The optical isolator of claim 16 wherein the radiation source is coupled to the input using a polarization-maintaining fiber.

19. The system of claim 16 wherein the radiation source is tunable.

20. The system of claim 16 wherein the radiation source is a laser.

21. The optical isolator of claim 16 wherein the phase retardation plate is a half wave ($\lambda/2$) phase retardation plate.

22. The optical isolator of claim 16 wherein the phase retardation plate is positioned at a selected angle relative to a light path.

* * * * *